US008174641B2

(12) United States Patent
Kosegawa et al.

(10) Patent No.: US 8,174,641 B2
(45) Date of Patent: May 8, 2012

(54) LIQUID CRYSTAL DISPLAY PANEL WITH MICROLENS ARRAY, ITS MANUFACTURING METHOD, AND LIQUID CRYSTAL DISPLAY DEVICE (75) Inventors: Seishi Kosegawa, Matsusaka (JP); Naru Usukura, Matsusaka (JP); Takehiro Murao, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 485 days.

(21) Appl. No.: 12/443,015

(22) PCT Filed: Aug. 28, 2007

(86) PCT No.: PCT/JP2007/066658
§ 371 (c)(1),
(2), (4) Date: Mar. 26, 2009

(87) PCT Pub. No.: WO2008/038487
PCT Pub. Date: Apr. 3, 2008

(65) Prior Publication Data
US 2010/0007815 A1 Jan. 14, 2010

(30) Foreign Application Priority Data

Sep. 28, 2006 (JP) ................................. 2006-264303

(51) Int. Cl.
G02F 1/1335 (2006.01)
G02B 27/10 (2006.01)
(52) U.S. Cl. ............................. 349/62; 349/95; 359/619
(58) Field of Classification Search .................... 349/62, 349/95, 112; 359/619
See application file for complete search history.

(56) References Cited

U.S. PATENT DOCUMENTS

| 4,345,249 A | 8/1982 | Togashi |
| 4,368,523 A | 1/1983 | Kawate |
| 4,889,412 A | 12/1989 | Clerc et al. |
| 4,955,698 A | 9/1990 | Knoll et al. |
| 5,132,819 A | 7/1992 | Noriyama et al. |
| 5,164,851 A | 11/1992 | Kanemori et al. |

(Continued)

FOREIGN PATENT DOCUMENTS

CN 1544985 A 11/2004

(Continued)

OTHER PUBLICATIONS

International Search Report for PCT/JP2007/066658, mailed Dec. 4, 2007.

(Continued)

*Primary Examiner* — Akm Ullah
(74) *Attorney, Agent, or Firm* — Nixon & Vanderhye, P.C.

(57) ABSTRACT

A liquid crystal display panel according to the present invention includes: a liquid crystal display panel including an electrical element substrate on which switching elements for controlling the light transmittance of a liquid crystal layer are formed so as to respectively correspond to pixels; a microlens array provided on a light-incident side of the liquid crystal display panel; a support provided on the light-incident side of the liquid crystal display panel so as to be in a peripheral region of the microlens array; a rear-face side optical film attached to the liquid crystal display panel via the support; and a wiring connection substrate mounted to the electrical element substrate. The electrical element substrate includes an overhang which projects from the support in the direction of the wiring connection substrate, and the wiring connection substrate is mounted to the overhang.

18 Claims, 3 Drawing Sheets

U.S. PATENT DOCUMENTS

| | | | |
|---|---|---|---|
| 5,179,456 A | 1/1993 | Aizawa et al. | |
| 5,182,664 A | 1/1993 | Clerc | |
| 5,245,450 A | 9/1993 | Ukai et al. | |
| 5,260,818 A | 11/1993 | Wu | |
| 5,289,174 A | 2/1994 | Suzuki | |
| 5,309,264 A | 5/1994 | Lien et al. | |
| 5,331,447 A | 7/1994 | Someya et al. | |
| 5,363,294 A | 11/1994 | Yamamoto et al. | |
| 5,408,345 A | 4/1995 | Mitsui et al. | |
| 5,434,687 A | 7/1995 | Kawata et al. | |
| 5,477,358 A | 12/1995 | Rosenblatt et al. | |
| 5,508,834 A | 4/1996 | Yamada et al. | |
| 5,512,336 A | 4/1996 | Yamahara | |
| 5,558,927 A | 9/1996 | Aruga et al. | |
| 5,594,570 A | 1/1997 | Hirata et al. | |
| 5,602,662 A | 2/1997 | Rosenblatt et al. | |
| 5,608,556 A | 3/1997 | Koma | |
| 5,636,043 A | 6/1997 | Uemura et al. | |
| 5,646,702 A | 7/1997 | Akinwande et al. | |
| 5,666,179 A | 9/1997 | Koma | |
| 5,668,651 A | 9/1997 | Yamada et al. | |
| 5,673,092 A | 9/1997 | Horie et al. | |
| 5,699,137 A | 12/1997 | Kishimoto | |
| 5,726,728 A | 3/1998 | Kondo et al. | |
| 5,748,276 A | 5/1998 | Uno et al. | |
| 5,753,093 A | 5/1998 | Raguse et al. | |
| 5,995,176 A | 11/1999 | Sibahara | |
| 6,031,591 A * | 2/2000 | Hamanaka | 349/95 |
| 6,061,117 A | 5/2000 | Horie et al. | |
| 6,069,740 A | 5/2000 | Hamanaka | |
| 6,097,464 A | 8/2000 | Liu | |
| 6,129,439 A | 10/2000 | Hou et al. | |
| 6,141,077 A | 10/2000 | Hirata et al. | |
| 6,169,593 B1 | 1/2001 | Kanaya et al. | |
| 6,175,398 B1 | 1/2001 | Yamada et al. | |
| 6,195,140 B1 | 2/2001 | Kubo et al. | |
| 6,201,592 B1 | 3/2001 | Terashita et al. | |
| 6,222,599 B1 | 4/2001 | Yoshida et al. | |
| 6,256,082 B1 | 7/2001 | Suzuki et al. | |
| 6,266,122 B1 | 7/2001 | Kishimoto et al. | |
| 6,287,649 B1 | 9/2001 | Fukushima et al. | |
| 6,330,047 B1 | 12/2001 | Kubo et al. | |
| 6,335,780 B1 | 1/2002 | Kurihara et al. | |
| 6,339,462 B1 | 1/2002 | Kishimoto et al. | |
| 6,340,998 B1 | 1/2002 | Kim et al. | |
| 6,341,002 B1 | 1/2002 | Shimizu et al. | |
| 6,342,938 B1 | 1/2002 | Song et al. | |
| 6,384,887 B1 | 5/2002 | Yasuda et al. | |
| 6,384,889 B1 | 5/2002 | Miyachi et al. | |
| 6,504,592 B1 | 1/2003 | Takatori et al. | |
| 6,512,564 B1 | 1/2003 | Yoshida et al. | |
| 6,542,212 B2 | 4/2003 | Yoshida et al. | |
| 6,567,144 B1 | 5/2003 | Kim et al. | |
| 6,573,964 B1 | 6/2003 | Takizawa et al. | |
| 6,573,965 B1 | 6/2003 | Liu et al. | |
| 6,577,366 B1 | 6/2003 | Kim et al. | |
| 6,593,982 B2 | 7/2003 | Yoon et al. | |
| 6,600,539 B2 | 7/2003 | Song | |
| 6,614,497 B2 | 9/2003 | Yamada | |
| 6,630,975 B1 | 10/2003 | Terashita | |
| 6,633,351 B2 * | 10/2003 | Hira et al. | 349/95 |
| 6,657,695 B1 | 12/2003 | Song et al. | |
| 6,661,488 B1 | 12/2003 | Takeda et al. | |
| 6,710,825 B2 | 3/2004 | Kubo et al. | |
| 6,717,642 B2 | 4/2004 | Sasaki et al. | |
| 6,784,961 B2 | 8/2004 | Suzuki et al. | |
| 6,788,375 B2 | 9/2004 | Ogishima et al. | |
| 6,812,986 B2 | 11/2004 | Takatori et al. | |
| 6,822,723 B2 | 11/2004 | Song et al. | |
| 6,829,026 B2 | 12/2004 | Sasaki et al. | |
| 6,839,108 B1 | 1/2005 | Hirakata et al. | |
| 6,862,062 B2 | 3/2005 | Kubo et al. | |
| 6,894,840 B2 | 5/2005 | Yamanaka et al. | |
| 6,924,856 B2 | 8/2005 | Okumura et al. | |
| 6,924,876 B2 | 8/2005 | Kubo et al. | |
| 6,950,160 B2 | 9/2005 | Kubo et al. | |
| 6,965,422 B2 | 11/2005 | Kubo et al. | |
| 6,967,702 B2 | 11/2005 | Ishii et al. | |
| 6,989,874 B2 | 1/2006 | Chae | |
| 6,995,826 B2 | 2/2006 | Kubo et al. | |
| 7,084,943 B2 | 8/2006 | Kubo et al. | |
| 7,139,055 B2 | 11/2006 | Ogishima et al. | |
| 7,145,624 B2 | 12/2006 | Kubo et al. | |
| 7,202,923 B2 | 4/2007 | Yamabuchi et al. | |
| 7,215,395 B2 | 5/2007 | Kubo et al. | |
| 7,230,664 B2 | 6/2007 | Kubo et al. | |
| 7,253,872 B2 | 8/2007 | Kume et al. | |
| 7,277,146 B2 | 10/2007 | Maeda | |
| 7,292,300 B2 | 11/2007 | Kubo et al. | |
| 7,375,781 B2 | 5/2008 | Kubo | |
| 7,379,137 B2 | 5/2008 | Kubo | |
| 7,391,489 B2 | 6/2008 | Kume et al. | |
| 7,499,136 B2 | 3/2009 | Kubo | |
| 7,505,102 B2 | 3/2009 | Kubo et al. | |
| 7,532,291 B2 | 5/2009 | Kubo et al. | |
| 7,583,332 B2 | 9/2009 | Lee | |
| 7,978,298 B2 * | 7/2011 | Saitoh et al. | 349/156 |
| 7,995,887 B2 * | 8/2011 | Kubo | 385/114 |
| 8,068,201 B2 * | 11/2011 | Kawashima et al. | 349/130 |
| 2001/0024257 A1 | 9/2001 | Kubo et al. | |
| 2001/0033353 A1 | 10/2001 | Shimoshikiryo | |
| 2002/0036740 A1 | 3/2002 | Kubo et al. | |
| 2002/0036744 A1 | 3/2002 | Kubo et al. | |
| 2002/0054269 A1 | 5/2002 | Maeda et al. | |
| 2002/0060764 A1 | 5/2002 | Taniguchi et al. | |
| 2002/0063834 A1 | 5/2002 | Sawasaki et al. | |
| 2002/0075436 A1 | 6/2002 | Kubo et al. | |
| 2002/0080320 A1 | 6/2002 | Suzuki et al. | |
| 2002/0149728 A1 | 10/2002 | Ogishima et al. | |
| 2002/0159012 A1 | 10/2002 | Yamada | |
| 2002/0171792 A1 | 11/2002 | Kubota et al. | |
| 2002/0191128 A1 | 12/2002 | Okumura et al. | |
| 2003/0001998 A1 | 1/2003 | Kun | |
| 2003/0107695 A1 | 6/2003 | Kubo et al. | |
| 2003/0112213 A1 | 6/2003 | Noguchi et al. | |
| 2003/0202144 A1 | 10/2003 | Kim et al. | |
| 2003/0227429 A1 | 12/2003 | Shimoshikiryo | |
| 2003/0231267 A1 | 12/2003 | Murai et al. | |
| 2004/0041770 A1 | 3/2004 | Kubo et al. | |
| 2004/0070714 A1 | 4/2004 | Ishii et al. | |
| 2004/0135949 A1 | 7/2004 | Maeda | |
| 2004/0201810 A1 | 10/2004 | Kubo et al. | |
| 2004/0225312 A1 | 11/2004 | Orloff et al. | |
| 2004/0233360 A1 | 11/2004 | Yoshida et al. | |
| 2005/0001947 A1 | 1/2005 | Ogishima et al. | |
| 2005/0030458 A1 | 2/2005 | Sasabayashi et al. | |
| 2005/0041186 A1 | 2/2005 | Shimoshikiryo | |
| 2005/0056127 A1 | 3/2005 | Yamabuchi et al. | |
| 2005/0078251 A1 | 4/2005 | Chen et al. | |
| 2005/0140876 A1 | 6/2005 | Kubo | |
| 2005/0168674 A1 | 8/2005 | Kubo | |
| 2005/0213008 A1 | 9/2005 | Kubo et al. | |
| 2005/0237463 A1 | 10/2005 | Kubo | |
| 2005/0270462 A1 | 12/2005 | Koma | |
| 2005/0280754 A1 | 12/2005 | Kume et al. | |
| 2006/0061708 A1 | 3/2006 | Umebayashi et al. | |
| 2006/0114405 A1 | 6/2006 | Yamaguchi et al. | |
| 2006/0119776 A1 | 6/2006 | Kubo et al. | |
| 2006/0139541 A1 | 6/2006 | Yamaguchi et al. | |
| 2006/0139758 A1 | 6/2006 | Segawa et al. | |
| 2006/0158574 A1 | 7/2006 | Kubo et al. | |
| 2006/0278874 A1 | 12/2006 | Kubo et al. | |
| 2006/0291065 A1 | 12/2006 | Hasei et al. | |
| 2007/0019132 A1 | 1/2007 | Kim et al. | |
| 2007/0097293 A1 | 5/2007 | Nakanishi et al. | |
| 2007/0139594 A1 | 6/2007 | Kubo et al. | |
| 2007/0199504 A1 | 8/2007 | Nakamura et al. | |
| 2007/0216827 A1 | 9/2007 | Okada et al. | |
| 2008/0266499 A1 | 10/2008 | Kubo | |
| 2009/0284683 A1 | 11/2009 | Usukura et al. | |
| 2010/0007815 A1 | 1/2010 | Kosegawa et al. | |
| 2010/0020263 A1 | 1/2010 | Murao et al. | |
| 2010/0039583 A1 | 2/2010 | Usukura | |
| 2010/0060813 A1 | 3/2010 | Kawashima et al. | |
| 2010/0110352 A1 | 5/2010 | Saitoh et al. | |

| | | | |
|---|---|---|---|
| 2010/0118227 | A1 | 5/2010 | Shibata et al. |
| 2010/0157213 | A1 | 6/2010 | Kubo |
| 2010/0182534 | A1 | 7/2010 | Usukura et al. |

FOREIGN PATENT DOCUMENTS

| | | |
|---|---|---|
| EP | 0 645 661 A1 | 3/1995 |
| EP | 0 884 626 A2 | 12/1998 |
| EP | 1 701 202 A1 | 9/2006 |
| JP | 63-21907 B2 | 5/1988 |
| JP | 63-296004 | 12/1988 |
| JP | 1-129234 | 5/1989 |
| JP | 02-149802 | 6/1990 |
| JP | 03-209440 | 9/1991 |
| JP | 04-139402 | 5/1992 |
| JP | 04-293018 | 10/1992 |
| JP | 04-318816 | 11/1992 |
| JP | 05-188364 | 7/1993 |
| JP | 05-289108 | 11/1993 |
| JP | 5-333328 | 12/1993 |
| JP | 06-034966 | 2/1994 |
| JP | 06-043461 | 2/1994 |
| JP | 6-75238 A | 3/1994 |
| JP | 06-118909 | 4/1994 |
| JP | 6-301036 | 10/1994 |
| JP | 6-331831 | 12/1994 |
| JP | 07-027913 | 1/1995 |
| JP | 07-036058 | 2/1995 |
| JP | 07-234400 | 9/1995 |
| JP | 7-281176 A | 10/1995 |
| JP | 07-311383 | 11/1995 |
| JP | 08-148254 | 6/1996 |
| JP | 08-292423 | 11/1996 |
| JP | 09-258266 | 10/1997 |
| JP | 09-269509 | 10/1997 |
| JP | 10-186330 A | 7/1998 |
| JP | 10-301114 A | 11/1998 |
| JP | 11-095197 | 4/1999 |
| JP | 11-109417 A | 4/1999 |
| JP | 11-242225 A | 9/1999 |
| JP | 11-295697 | 10/1999 |
| JP | 2000-47217 | 2/2000 |
| JP | 2000-47253 | 2/2000 |
| JP | 2000-075296 | 3/2000 |
| JP | 2000-249807 | 9/2000 |
| JP | 2000-305110 | 11/2000 |
| JP | 2000-329906 | 11/2000 |
| JP | 2001-021862 A | 1/2001 |
| JP | 2001-343647 A | 12/2001 |
| JP | 2002-055343 A | 2/2002 |
| JP | 2002-236283 | 8/2002 |
| JP | 2003-035824 | 2/2003 |
| JP | 2003-043514 | 2/2003 |
| JP | 2003-43525 A | 2/2003 |
| JP | 2003-270636 | 9/2003 |
| JP | 2003-280548 | 10/2003 |
| JP | 2003-315803 | 11/2003 |
| JP | 2003-337207 | 11/2003 |
| JP | 2004-302195 | 10/2004 |
| JP | 2004-325503 | 11/2004 |
| JP | 2005-128082 | 5/2005 |
| JP | 2005-195733 | 7/2005 |
| JP | 2005-208553 | 8/2005 |
| JP | 2005-221639 | 8/2005 |
| JP | 2005-266370 | 9/2005 |
| JP | 2005-313638 | 11/2005 |
| JP | 2006-091229 | 4/2006 |
| JP | 2006-098525 A | 4/2006 |
| JP | 2006-184334 | 7/2006 |
| JP | 2006-184673 | 7/2006 |
| JP | 2006-220711 | 8/2006 |
| JP | 2006-293410 | 10/2006 |
| JP | 2007-133037 | 5/2007 |
| JP | 2007-329099 | 12/2007 |
| JP | 2008-242307 A | 10/2008 |
| KR | 2003-058012 A | 7/2003 |
| KR | 2003-058140 A | 7/2003 |
| WO | 00/22677 | 4/2000 |

OTHER PUBLICATIONS

K. Kalantar, "Viewing Angle Control Using Optical Microstructures on Light-Guide Plate for Illumination System of Mobile Transmissive LCD Module", IDW "02", pp. 549-552.

A. Funamoto et al., "Prism-sheetless High Bright Backlight System for Mobile Phone", Omron Corporation, IDW "04", pp. 687-690.

U.S. Appl. No. 12/440,791, Usukura, Filed Mar. 11, 2009.

International Preliminary Report on Patentability mailed Mar. 26, 2009 in corresponding PCT Application No. PCT/JP2007/064448.

International Preliminary Report on Patentability mailed Apr. 9, 2009 in PCT Application No. PCT/JP2007/066658.

U.S. Appl. No. 12/442,218, filed Mar. 20, 2009, entitled "Liquid Crystal Display Panel Provided with Microlens Array, Method for Manufacturing the Liquid Crystal Display Panel, and Liquid Crystal Display Device".

U.S. Appl. No. 12/522,448, filed Jul. 8, 2009, entitled "Liquid Crystal Display Panel with Micro-Lens Array and Liquid Crystal Display Device".

Sugita et al, "Brightness Enhancement in Transflective LCD by Concentration of Uniaxially Collimated Light with a Micro-Lenticular Lens",, IDW 2007, pp. 1515-1518.

U.S. Appl. No. 12/593,403, filed Sep. 28, 2009, entitled "Liquid Crystal Display Panel with Microlens Array and Method for Manufacturing the Same".

U.S. Notice of Allowance mailed Aug. 29, 2011 in U.S. Appl. No. 12/519,447.

International Search Report for PCT/JP2007/073231, mailed Feb. 12, 2008.

U.S. Office Action mailed Feb. 2, 2011 in U.S. Appl. No. 12/440,791.

International Preliminary Report on Patentability mailed Apr. 9, 2009 in PCT Application No. PCT/JP2007/064447.

International Search Report for PCT/JP2006/315142 mailed Aug. 22, 2006.

U.S. Office Action mailed Jun. 23, 2010 in U.S. Appl. No. 11/997,563.

Notice of Allowance mailed Apr. 27, 2011 in U.S. Appl. No. 11/997,563.

International Search Report for PCT/JP2007/070907, mailed Nov. 20, 2007.

International Search Report for PCT/JP2008/001350, mailed Jul. 1, 2008.

Final Office Action mailed Jul. 20, 2011 in U.S. Appl. No. 12/440,791.

English translation of International Preliminary Report on Patentability mailed in PCT Application No. PCT/JP2007/070907, Dec. 29,2009.

International Search Report for PCT/JP2007/074635, mailed Jan. 29, 2008.

English translation of the International Preliminary Report on Patentability mailed Feb. 14, 2008 in PCT Application No. PCT/JP2006/315142.

Kubo et al., "Development of High-Performance ASV-LCDs Using Continuous Pinwheel Alignment (CPA) Mode", pp. 1-5, Jun. 7, 2001.

EP Supplementary Search Report mailed Dec. 17, 2009 in EP application 07791179.0.

EP Supplementary Search Report mailed Dec. 29, 2009 in EP application 07806137.1.

U.S. Office Action mailed Feb. 17, 2011 in related U.S. Appl. No. 12/442,218.

U.S. Office Action mailed Jul. 29, 2011 in related U.S. Appl. No. 12/293,895.

Notice of Allowance mailed Mar. 7, 2011 in related U.S. Appl. No. 12/293,895.

International Preliminary Report on Patentability mailed Jul. 2, 2009 in PCT Application No. PCT/JP2007/073231.

English translation of the International Preliminary Report on Patentability mailed Oct. 30, 2008 in PCT Application No. PCT/JP2007/053037.

International Search Report for PCT/JP2007/053037, mailed Mar. 27, 2007.

English translation of the International Preliminary Report on Patentability mailed Oct. 29, 2009 in corresponding PCT Application No. PCT/JP2007/074635.

English translation of the International Preliminary Report on Patentability mailed Jan. 7, 2010 in corresponding PCT Application No. PCT/JP2008/001350.

Final U.S. Office Action mailed Apr. 30, 2009 in U.S. Appl. No. 12/081,752.

International Search Report for PCT/JP207/064448 mailed Aug. 21, 2007.

U.S. Office Action mailed Nov. 14, 2008 in U.S. Appl. No. 12/081,752.

Jisaki et al, "Development of transflective LCD for high contrast and wide viewing angle by using homeotropic alignment", Asia Display/IDW '01, pp. 133-136, Year of 2001.

KR Notice of Reasons for Rejection and English translation thereof mailed Apr. 25, 2006 in corresponding Korean application No. 10-2004-0110955.

Jignesh Gandhi et al., "Performance Enhancement of reflective CMOS Twistes Nematic Disp Projection Applications Using Compensating Films", pp. 1-6, reprinted from http://www/hanoah.com/publications/sid99 paper Jignesh final pdf. (1999).

Thomson-CSFILR—Jan. 2000, "Optical compensation for displays".

* cited by examiner

LIQUID CRYSTAL DISPLAY PANEL WITH MICROLENS ARRAY, ITS MANUFACTURING METHOD, AND LIQUID CRYSTAL DISPLAY DEVICE

This application is the U.S. national phase of International Application No. PCT/JP2007/066658, filed 28 Aug. 2007, which designated the U.S. and claims priority to Japanese Patent Application No. 2006-264303, filed 28 Sep. 2006, the entire contents of each of which are hereby incorporated by reference.

TECHNICAL FIELD

The present invention relates to a liquid crystal display panel and a liquid crystal display device, and more particularly to a liquid crystal display panel which include a microlens array and a production method thereof.

BACKGROUND ART

In recent years, liquid crystal display devices are widely used as display devices for monitors, projectors, mobile information terminals, mobile phones, and the like. Generally speaking, a liquid crystal display device allows the transmittance (or reflectance) of a liquid crystal display panel to vary with a driving signal, thus modulating the intensity of light from a light source for irradiating the liquid crystal display panel, whereby images and text characters are displayed. Liquid crystal display devices include direct-viewing type display devices in which images or the like that are displayed on the liquid crystal display panel are directly viewed, projection-type display devices (projectors) in which images or the like that are displayed on the display panel are projected onto a screen through a projection lens in an enlarged size, and so on.

By respectively applying driving voltages which correspond to an image signal to the pixels that are in a regular matrix arrangement, a liquid crystal display device causes a change in the optical characteristics of a liquid crystal layer in each pixel, and regulates the transmitted light in accordance with the optical characteristics of the liquid crystal layer with polarizers (which typically are polarizing plates) being disposed at the front and rear thereof, thereby displaying images, text characters, and the like. In the case of a direct-viewing type liquid crystal display device, these polarizing plates are usually directly attached to a light-entering substrate (the rear substrate) and a light-outgoing substrate (the front substrate or viewer-side substrate) of the liquid crystal display panel.

Methods for applying an independent driving voltage for each pixel include a passive matrix type and an active matrix type. Among these, on a liquid crystal display panel of the active matrix type, switching elements and wiring lines for supplying driving voltages to the pixel electrodes need to be provided. As switching elements, non-linear 2-terminal devices such as MIM (metal-insulator-metal) devices and 3-terminal devices such as TFT (thin film transistor) devices are in use.

On the other hand, in a liquid crystal display device of the active matrix type, when strong light enters a switching element particular a TFT) which is provided on the display panel, its element resistance in an OFF state is decreased, thereby allowing the electric charge which was charged to the pixel capacitor under an applied voltage to be discharged, such that a predetermined displaying state cannot be obtained. Thus, there is a problem of light leakage even in a black state, thus resulting in a decreased contrast ratio.

Therefore, in a liquid crystal display panel of the active matrix type, in order to prevent light from entering the TFTs (in particular channel regions), a light shielding layer (called a black matrix) is provided on a TFT substrate on which the TFTs and the pixel electrodes are provided, or on a counter substrate that opposes the TFT substrate via the liquid crystal layer, for example.

Now, in the case where the liquid crystal display device is a reflection-type liquid crystal display device, decrease in the effective pixel area can be prevented by utilizing reflection electrodes as a light shielding layer. However, in a liquid crystal display device which performs displaying by utilizing transmitted light, providing a light shielding layer in addition to the TFTs, gate bus lines, and source bus lines, which do not transmit light, will allow the effective pixel area to be decreased, thus resulting in a decrease in the ratio of the effective pixel area to the total area of the displaying region, i.e., the aperture ratio.

Note that this tendency becomes more pronounced as liquid crystal display panels become higher in resolution and smaller in size. The reason is that, even if there is a desire to reduce the pixel pitch, constraints such as electrical performance and fabrication techniques make it impossible for the TFTs, the bus lines, etc., to become smaller than certain sizes.

Particularly in recent years, as display devices of mobile devices, e.g., mobile phones, transflective-type liquid crystal display devices have become prevalent, which perform displaying under dark lighting by utilizing light from a backlight that is transmitted through the liquid crystal display panel, and which perform displaying under bright lighting by reflecting light entering the display surface from the surroundings of the liquid crystal display panel. In a transflective-type liquid crystal display device, a region (reflection region) which performs displaying in the reflection mode and a region (transmission region) which performs displaying in the transmission mode are included in each pixel. Therefore, reducing the pixel pitch significantly will lower the ratio of the area of the transmission region to the total area of the displaying region (aperture ratio of the transmission region). Thus, although transflective-type liquid crystal display devices have the advantage of realizing displaying with a high contrast ratio irrespective of the ambient brightness, they have a problem in that their brightness is lowered as the aperture ratio of the transmission region becomes smaller.

As one method for improving the efficiency of light utility of such a liquid crystal display device including transmission regions, Patent Document 1 and Patent Document 2 disclose a method of providing a microlens array for converging light in each pixel on the liquid crystal display panel in order to improve the effective aperture ratio of the liquid crystal display panel. Moreover, the applicant discloses in Patent Document 3 a production method for a liquid crystal display panel with a microlens array, which is suitably used for transmission-type or transflective-type liquid crystal display devices and the like. According to the production method described in Patent Document 3, microlenses can be formed within a pixel in a self-aligning manner, with a high positional precision. Moreover, Patent Document 4 describes a thermocompression apparatus for mounting a flexible printed wiring board to a TFT substrate.

[Patent Document 1] Japanese Laid-Open Patent Publication No. 2005-195733

[Patent Document 2] Japanese Laid-Open Patent Publication No. 2005-208553

[Patent Document 3] Japanese Laid-Open Patent Publication No. 2005-196139

[Patent Document 4] Japanese Laid-Open Patent Publication No. 8-148254

DISCLOSURE OF INVENTION

Problems to be Solved by the Invention

As shown in FIGS. 5 to 9 of Patent Document 2, in the conventional liquid crystal display panel, a microlens array is disposed in a recess which is formed on a face of the TFT substrate that is closer to the light source. This recess is formed by performing an etching treatment for the face of the TFT substrate opposite from the face on which the switching elements are formed. The microlens array is formed by, after this recess is formed, filling the interior of the recess with a microlens-forming material, and using a photolithography process to pattern the microlens-forming material after filling. The periphery of the TFT substrate is left as a thick layer portion (or a terrace portion), rather than being removed by etching, and a polarizing plate is attached on a face of this thick layer portion that is closer to the light source.

If the thick layer portion were not formed, the polarizing plate would be attached to the microlens array. In this case, the contact area between the polarizing plate and the microlens array would be small, and the end of the polarizing plate would be free, rather than being in contact with the microlens array, thus causing a problem in that the polarizing plate is likely to peel. However, this problem is solved by providing the aforementioned thick layer portion around the microlens array and attaching a polarizing plate to the thick layer portion.

However, in the case of producing a conventional liquid crystal display panel as shown in Patent Document 2, there is a problem the number of production steps is large because, not only a step of forming a recess in the TFT substrate through etching, but also a step of thereafter forming the microlens array through a photolithography process is required.

In order to solve this problem concerning the number of steps, without forming the aforementioned recess in the TFT substrate, a microlens array may be formed on a face of the TFT substrate through a photolithography process, and thereafter within the same step, a support for mounting a polarizing plate may be formed in the neighborhood of the microlens array from the same material as the material that composes the microlens array, instead of the aforementioned thick layer portion. In this case, the support will be formed in essentially the same position and in essentially the same size as the thick layer portion.

Figure 6:
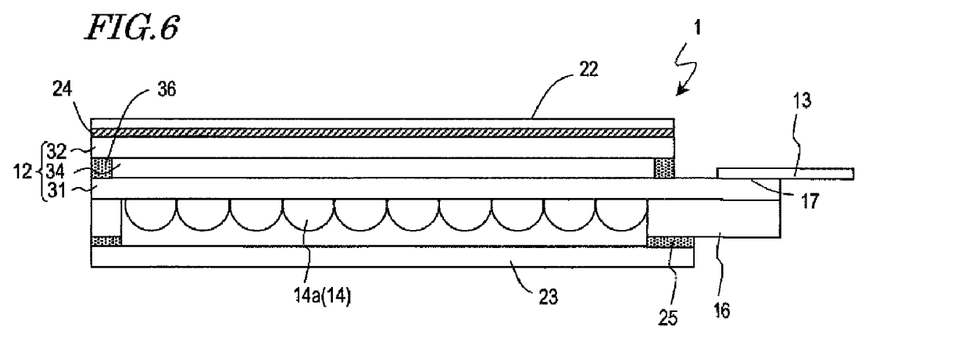
FIG. 6 A cross-sectional view showing an exemplary liquid crystal display panel with a microlens array, used for explaining a problem to be solved by the present invention.

FIG. 6 is a diagram schematically showing the construction of a liquid crystal display panel with a microlens array having such a support.

As shown in the figure, the liquid crystal display panel 1 with a microlens array includes: a microlens array 14 including a plurality of microlenses 14a provided on a light-incident side (lower side in the figure) of a liquid crystal display panel 12; a front-face side optical film 22 provided on the viewer's side (upper side in the figure) of the liquid crystal display panel 12; a rear-face side optical film 23 provided on the light-incident side of the microlens array 14; and a support 16 provided in the peripheral region of the microlens array 14 for retaining the rear-face side optical film 23. The front-face side optical film 22 is attached to the liquid crystal display panel 12 via an adhesion layer 24, and the rear-face side optical film 23 is attached to the support 16 via an adhesion layer 25.

The liquid crystal display panel 12 includes an electrical element substrate 31 on which switching elements (e.g. TFT or MIM devices) are provided for the respective pixels, a counter substrate 32, and a liquid crystal layer 34. The liquid crystal layer 34 includes a liquid crystal which is contained between the electrical element substrate 31 and the counter substrate 32, and is sealed by a sealant 36 that is provided in the outer periphery.

However, the inventors have found that the following problems will occur in the production process of the aforementioned liquid crystal display liquid crystal display panel 1 with a microlens array.

On the liquid crystal display panel, a flexible printed wiring board is mounted for connecting signal lines of the liquid crystal display panel to an external driving circuit. As shown in FIG. 3 of Patent Document 2, in the conventional liquid crystal display panel, the flexible printed wiring board is mounted to a thick layer portion which is around the TFT substrate.

Mounting of the flexible printed wiring board is performed by using a thermocompression apparatus as shown in Patent Document 4, for example. Specifically, the mounting is performed with the following method. First, while accurately positioning the connection electrodes (a terminal portion) which are formed in a thick layer portion of the TFT substrate against the connection electrodes of the flexible printed wiring board, one end of the flexible printed wiring board is overlaid on the thick layer portion of the TFT substrate via an anisotropic electrically conductive film. Next, the TFT substrate and the flexible printed wiring board in this state are placed on a stage of the thermocompression apparatus, and the tip of a heater tool of a thermocompression head is pressed against the portion of connection between the flexible printed wiring board and the TFT substrate. Thereafter, the heater tool is heated to melt the anisotropic electrically conductive film, whereby the flexible printed wiring board is thermocompressed onto the TFT substrate and both wiring lines are electrically connected.

Since the liquid crystal display panel 1 with a microlens array shown in FIG. 6 includes the support 16 instead of a thick layer portion, the flexible printed wiring board 13 is to be mounted to a face 17 which is at an end of the upper face of the electrical element substrate 31 and which is on the rear side of the face on which the support 16 is formed. However, it has been found that a problem exists when mounting the flexible printed wiring board 13 using the aforementioned thermocompression apparatus in that the support 16 will experience chipping and cracking. The inventors have studied this problem and found that, in the press-fitting step against the flexible printed wiring board 13, chipping and cracking will occur in the corner portions and the like of the glass with a very high rate of about 60%, due to irregularities on the support 16. A possible cause for this is that the pressure acting on the substrate during the press-fit may become lopsided due to minute projections on the support 16, a tilt of the surface of the support 16, differences in thickness of the support 16, and so on, for example.

The present invention has been made in view of the aforementioned problems, and an objective thereof is to provide a high-quality liquid crystal display panel with microlenses which has a good production efficiency and experiences little problem in the production steps, a production method thereof, and a liquid crystal display device incorporating the same.

Means for Solving the Problems

A liquid crystal display panel with a microlens array according to the present invention comprises: a liquid crystal display panel including an electrical element substrate on which switching elements are formed so as to respectively correspond to pixels; a microlens array provided on a light-incident side of the liquid crystal display panel; a support provided on the light-incident side of the liquid crystal display panel so as to be in a peripheral region of the microlens array; a rear-face side optical film attached to the liquid crystal display panel via the support; and a wiring connection substrate mounted to the electrical element substrate, wherein, the electrical element substrate includes an overhang which projects from the support in a direction of the wiring connection substrate, and the wiring connection substrate is mounted to the overhang.

In one embodiment, the overhang projects from the support in the direction of the wiring connection substrate by no less than 0.5 mm and no more than 5.0 mm.

In one embodiment, an end of the wiring connection substrate is located on the overhang.

In one embodiment, a distance between the end of the wiring connection substrate and an end of the support that is closer to the wiring connection substrate is no less than 0.3 mm and no more than 4.0 mm.

In one embodiment, the support is made of a same material as the microlens array.

In one embodiment, an electrical connection terminal of the electrical element substrate is formed on a face of the overhang.

In one embodiment, a plurality of protrusions are formed between the microlens array and the rear-face side optical film.

A production method for a liquid crystal display panel with a microlens array according to the present invention is a production method for a liquid crystal display panel with a microlens array, the liquid crystal display panel having a liquid crystal display panel, a microlens array provided on a light-incident side of the liquid crystal display panel, and a rear-face side optical film provided on a light-incident side of the microlens array, the method comprising: (a) a step of providing a liquid crystal display panel, the liquid crystal display panel having an electrical element substrate on which switching elements are formed so as to respectively correspond to pixels; (b) a step forming a resin layer on a face of the liquid crystal display panel; (c) a step of processing the resin layer to form a microlens array and a support which is in a peripheral region of the microlens array; (d) a step of attaching a rear-face side optical film to the liquid crystal display panel via the support; and (e) a step of mounting a wiring connection substrate to the electrical element substrate, wherein, in step (c), an outside end of the support is formed inside, by a predetermined distance, of an end of the electrical element substrate; and in step (e), the wiring connection substrate is mounted to a portion of the electrical element substrate spanning between the end of the support and the end of the electrical element substrate.

In one embodiment, in step (c), the end of the support is formed inside of the end of the electrical element substrate by no less than 0.5 mm and no more than 5.0 mm.

In one embodiment, in step (e), the wiring connection substrate is mounted so that an end of the wiring connection substrate is located between the end of the support and the end of the electrical element substrate.

In one embodiment, a distance between the end of the support and the end of the wiring connection substrate is no less than 0.3 mm and no more than 4.0 mm.

In one embodiment, the resin layer is formed in step (b) is a photocurable resin layer; and step (c) comprises a step of exposing the photocurable resin layer to light through the liquid crystal display panel.

One embodiment comprises a step of forming an electrical connection terminal of the electrical element substrate in the portion of the electrical element substrate spanning between the end of the support and the end of the electrical element substrate.

One embodiment comprises a step of processing the resin layer to form a plurality of protrusions on a surface of the microlens array.

A liquid crystal display device according to the present invention comprises: a liquid crystal display panel including an electrical element substrate on which switching elements for controlling light transmittance of the liquid crystal layer are provided so as to respectively correspond to pixels; a microlens array provided on a light-incident side of the liquid crystal display panel; a support provided on the light-incident side of the liquid crystal display panel so as to be in a peripheral region of the microlens array; a rear-face side optical film attached to the liquid crystal display panel via the support; and a wiring connection substrate mounted to the electrical element substrate, wherein, the electrical element substrate includes an overhang which projects from the support in a direction of the wiring connection substrate, and the wiring connection substrate is mounted to the overhang.

In one embodiment, an end of the wiring connection substrate is located on the overhang.

In one embodiment, the support is made of a same material as the microlens array.

Moreover, a liquid crystal display panel according to the present invention comprises: a liquid crystal display panel including an electrical element substrate on which switching elements are formed so as to respectively correspond to pixels; a microlens array provided on a light-incident side of the liquid crystal display panel; a support provided on the light-incident side of the liquid crystal display panel so as to be in a peripheral region of the microlens array; a rear-face side optical film attached to the liquid crystal display panel via the support; and a wiring connection substrate mounted to the electrical element substrate, wherein, a thickness of the electrical element substrate at a position where the wiring connection substrate is mounted is substantially equal to a thickness of the electrical element substrate at a position where the microlens array is formed.

Effects of the Invention

According to the present invention, the wiring connection substrate is mounted to a portion (overhang) of the electrical element substrate where the support is not formed, thereby preventing chipping and cracking of the material, which might occur in a step of mounting the flexible printed wiring board. As a result, there are provided a high-quality liquid crystal display panel with a microlens array and a liquid crystal display device which have a good production efficiency and experience little problem in the production steps. Moreover, according to the present invention, there is provided a method for efficiently producing such a liquid crystal display panel and liquid crystal display device.

DESCRIPTION OF REFERENCE NUMERALS 1 liquid crystal display panel with a microlens array
12 liquid crystal display panel
13 flexible printed wiring board
14 microlens array
14a microlens
14a' latent image of microlens
16 support
22 front-face side optical film
23 rear-face side optical film
24, 25 adhesion layer
26 support
26' latent image of support
30 electrical element substrate
31 electrical element substrate
32 counter substrate
34 liquid crystal layer
37 overhang
38 protrusion
40 photomask
41 backlight
100A, 100B, 100C liquid crystal display panel with a microlens array
200 liquid crystal display device

BEST MODE FOR CARRYING OUT THE INVENTION

Hereinafter, with reference to the drawings, the structure of a liquid crystal display panel with a microlens array according to an embodiment of the present invention will be described.

Figure 1:
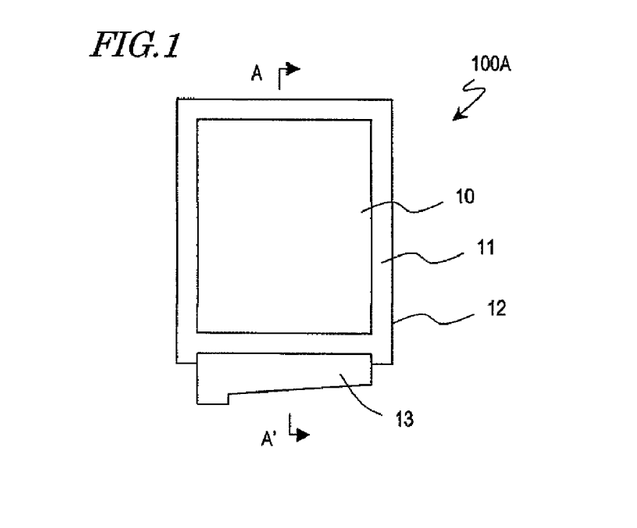
FIG. 1 A plan view schematically showing a liquid crystal display panel with a microlens array according to the present embodiment.
Figure 2:
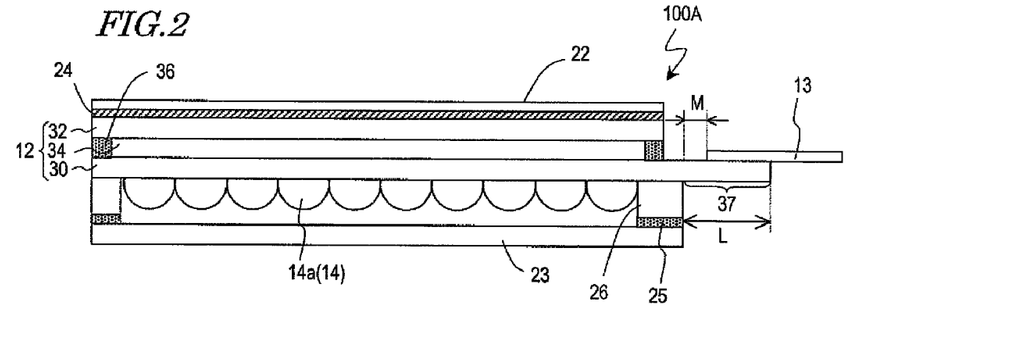
FIG. 2 A cross-sectional view showing the construction of a liquid crystal display panel with a microlens array according to the present embodiment, along an A-A' cross section in FIG. 1.

FIG. 1 is a plan view schematically showing the liquid crystal display panel with a microlens array of the present embodiment. FIG. 2 is a cross-sectional view showing the construction of the liquid crystal display panel with a microlens array of the present embodiment along an A-A' cross section in FIG. 1.

As shown in FIG. 1, the liquid crystal display panel 100A with a microlens array of the present embodiment includes: a liquid crystal display panel (also referred to as the "liquid crystal cell") 12, which includes a displaying region 10 having a plurality of pixels in a matrix arrangement and a peripheral region 11 around it; and a flexible printed wiring board (also referred to as the flexible printed circuit (FPC)) 13, which is a wiring connection substrate. The flexible printed wiring board 13 is used for connecting the signal lines of the liquid crystal display panel 12 to a liquid crystal driving circuit not shown.

Furthermore, as shown in FIG. 2, the liquid crystal display panel 100A with a microlens array includes: a microlens array 14 including a plurality of microlenses 14a provided on a light-incident side (lower side in the figure) of the liquid crystal display panel 12; a front-face side optical film 22 provided on the viewer's side (upper side in the figure) of the liquid crystal display panel 12; a rear-face side optical film 23 provided on the light-incident side of the microlens array 14; and a support 26 provided between the liquid crystal display panel 12 and the rear-face side optical film 23 and in the peripheral region of the microlens array 14.

The front-face side optical film 22 is attached to the liquid crystal display panel 12 via an adhesion layer 24, and the rear-face side optical film 23 is attached to the support 26 via an adhesion layer 25. Note that the front-face side optical film 22 and the rear-face side optical film 23 each at least include a polarization film which transmits linearly polarized light. The support 26 is preferably made of the same material as the microlenses 14a, and is preferably formed in the same step, as will be described later.

The liquid crystal display panel 12 includes an electrical element substrate 30 on which switching elements (e.g., TFTs or MIM devices) are provided for the respective pixels, a counter substrate 32, and a liquid crystal layer 34. The liquid crystal layer 34 includes a liquid crystal material which is contained between the electrical element substrate 30 and the counter substrate 32, and is sealed by a sealant 36 that is provided in the outer periphery.

The electrical element substrate 30 includes an overhang 37 which projects from the support 26 in the direction of the flexible printed wiring board 13. On the upper face (the face closer to the liquid crystal layer 34) of the overhang 37, connection electrodes of the electrical element substrate 30 are formed. The flexible printed wiring board 13 is mounted to the upper face of the overhang 37, and the connection electrodes of the electrical element substrate 30 and the flexible printed wiring board 13 are electrically connected.

The length L of the overhang 37 is 2.5 mm, and preferably no less than 0.5 mm and no more than 5.0 mm. The end of the flexible printed wiring board 13 closer to the liquid crystal display panel 12 is located on the face of the overhang 37. The distance M between this end and the outside end of the support 26 when seen perpendicularly with respect to the substrate plane is 1.0 mm, and preferably no less than 0.3 mm and no more than 4.0 mm.

Although the microlenses 14a of the microlens array 14 are provided so as to correspond to the respective pixels in the present embodiment, the microlens array 14 may be composed of lenticular lenses. Although the flexible printed wiring board 13 is illustrated as being mounted to the upper face of the overhang 37 of the electrical element substrate 30, the connection electrodes of the electrical element substrate 30 may be formed on the lower face (the face closer to the microlens array 14) of the overhang 37, and the flexible printed wiring board 13 may be mounted to the lower face of the overhang 37.

Next, a variant of the present embodiment will be described with reference to FIG. 3.

Figure 3:
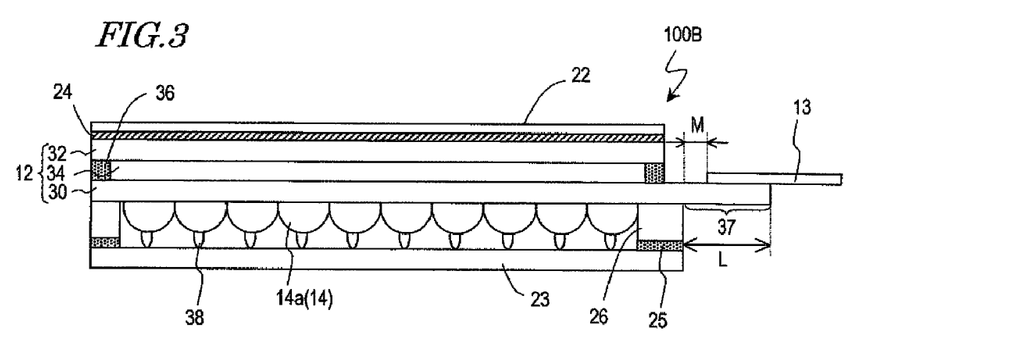
FIG. 3 A cross-sectional view schematically showing a variant of the liquid crystal display panel with a microlens array according to the present embodiment.

As shown in FIG. 3, the variant liquid crystal display panel 100B with a microlens array includes, in addition to the liquid crystal display panel 100A with a microlens array as shown in FIG. 2, a plurality of protrusions 38 which are provided between the microlens array 14 and the rear-face side optical film 23; otherwise, it is identical to the embodiment shown in FIG. 2. Like constituent elements are denoted with like reference numerals, and the descriptions thereof are omitted.

A protrusion 38 is formed for each microlens 14a, at the apex portion of the microlens 14a. The tip end (the end closer to the rear-face side optical film 23) of each protrusion 38 reaches the rear-face side optical film 23. Therefore, the rear-face side optical film 23 is retained by not only the support 26 but also the protrusions 38, whereby the distance between the microlenses 14a and the rear-face side optical film 23 is kept more uniform and constant.

In the liquid crystal display panel 100B, the support 26 and the plurality of protrusions 38 act to keep a constant interval between the rear-face side optical film 23 and the microlens 14, thereby reducing and preventing brightness unevenness and deterioration in reliability caused by a close contact occurring between them. Furthermore, by forming the support 26 and the protrusions 38 from the same material as the microlens 14, it becomes possible to produce a liquid crystal display panel with a microlens array through a relatively simple method, whereby the production cost can be reduced.

Note that the protrusions 38 may be provided on a surface of the rear-face side optical film 23 that is closer to the microlens array 14. Moreover, the protrusions 38 do not need to be provided so as to correspond to the respective microlenses 14a, but may be selectively provided for some of the plurality of microlenses 14a. For example, one protrusion may be provided for three microlenses. Furthermore, the protrusions do not need to be provided at the apex portions of the microlenses 14a, but may be provided between adjoining microlenses.

In the above-described liquid crystal display panels 100A and 100B with a microlens array, the flexible printed wiring board 13 is mounted to the overhang 37 of the electrical element substrate 30, whereby chipping and cracking of the substrate during the mounting can be prevented. In a comparison with a conventional liquid crystal display panel with a microlens array, the frequency of occurrence of problems such as chipping and cracking was found to be about 60% for the conventional liquid crystal display panel with a microlens array, and essentially 0% for the liquid crystal display panels 100A and 100B with a microlens array according to the present invention.

The present invention is suitably applied to a liquid crystal display panel having a pixel pitch of 70 μm to 250 μm, and in particular to a liquid crystal display panel with a pixel pitch of 200 μm or less. The diameter of each microlens (a width along a direction in which its lens function is exhibited) is set substantially equal to the pixel pitch. The height of each microlens is about 10 μm to 35 μm, and is essentially in proportion to the microlens diameter.

Note that, as another variant of the present embodiment, a construction is possible where no support is formed in the above-described liquid crystal display panel 100A or 100B with a microlens array. In that case, the rear-face side optical film 23 is to be attached to the apex portion of each microlens 14a of the microlens array 14 in FIG. 2, or to each protrusion 38 in FIG. 3. In this case, too, the flexible printed wiring board 13 is to be formed on the upper face of the overhang 37 of the electrical element substrate 30, whose lower face does not have any resin layer or the like formed thereon. Therefore, the thickness of the electrical element substrate 30 at the position where the flexible printed wiring board 13 is mounted is substantially equal to the thickness of the electrical element substrate 30 at the position where the microlens array 14 is formed.

Next, with reference to FIG. 4, a preferable production method for the liquid crystal display panel with a microlens array according to the present invention will be described.

Figure 4:
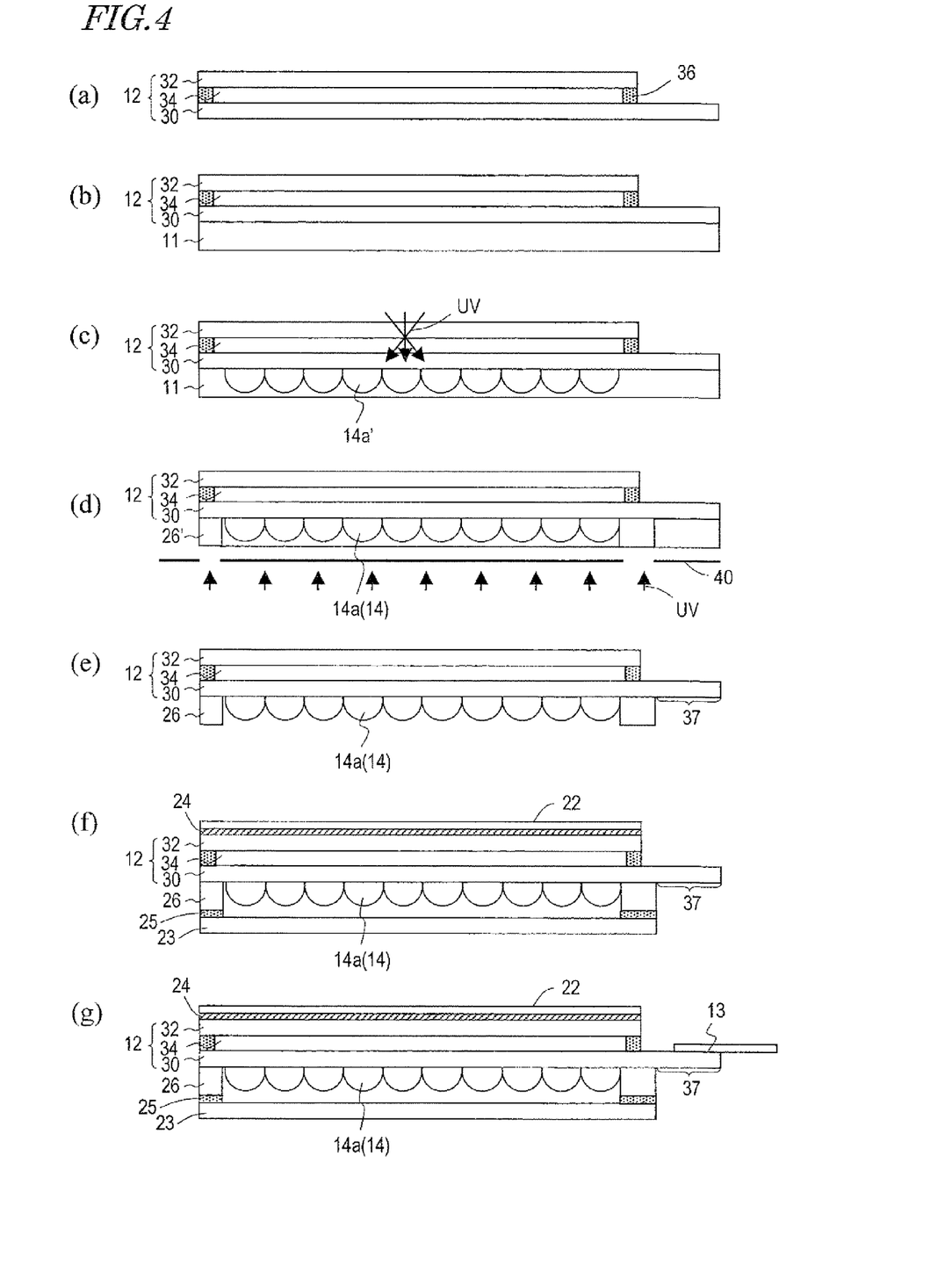
FIG. 4 (a) to (g) are cross-sectional views schematically showing a production method for a liquid crystal display panel with a microlens array according to the present embodiment.

First, as shown in FIG. 4(a), a liquid crystal display panel 12 having a plurality of pixels in a matrix arrangement is provided. Herein, one end of the electrical element substrate 30 of the liquid crystal display panel 12 projects outside from the end of the counter substrate 32. This step includes a step of forming electrical connection terminals of the electrical element substrate 30, in a portion of the electrical element substrate 30 spanning between an outside end of the support 26 and the end of the electrical element substrate 30 (the portion corresponding to the aforementioned overhang 37).

Next, as shown in FIG. 4(b), a resin layer 11 is formed on one of a pair of principal faces outside the liquid crystal display panel 12.

Then, as shown in FIGS. 4(c) to (e), a microlens array 14 having a plurality of microlenses 14a and a support 26 are formed by processing the resin layer 11.

Preferably, the resin layer 11 is made of a photocurable resin. By using a photocurable resin, as shown in FIG. 4(c), the microlenses 14a (latent images 14a' of microlenses) can be formed by exposing the photocurable resin layer 11 to light through the liquid crystal display panel 12. At this time, in FIG. 4(c), the overhang 37 is shielded from light. Formation of the microlenses 14a is preferably performed by the method described in Patent Document 3.

Thereafter, as shown in FIG. 4(d), the resin layer 11 is exposed to light from the opposite side of the liquid crystal display panel 12 through a photomask 40, thereby forming a support 26 (a latent image 26' of the support). Herein, the latent image 26' of the support in the neighborhood of one end of the electrical element substrate 30 (the right end in the figure) is to be formed inside, by a predetermined distance, of the end of the electrical element substrate 30. In the case of producing the liquid crystal display panel 100B with a microlens array shown in FIG. 3, which has a plurality of protrusions 38, the protrusions 38 (latent images of the protrusions) can be formed simultaneously with the support 26 by changing the pattern of the apertures (light-transmitting portions) of the photomask 40.

By performing a development step after the exposure step, as shown in FIG. 4(e), the microlens array 14 having a plurality of microlenses 14a is formed, and the support 26 is formed in the peripheral region of the microlens array 14. At one end of the electrical element substrate 30, the overhang 37 projecting further outside of the outside end of the support 26 is formed.

At this time, the heights of the support 26 and the protrusions 38 are defined by the thickness of the resin layer 11. Therefore, a resin layer 11 with a highly uniform thickness can be obtained by using a dry film resist, for example, thus providing an advantage of being able to precisely control the heights (maximum heights) of the support 26 and the protrusions 38.

Thereafter, as shown in FIG. 4(f), the rear-face side optical film 23 is attached to the liquid crystal display panel 12 via an adhesion layer 25 and the support 26, and the front-face side optical film 22 is attached to the liquid crystal display panel 12 via an adhesion layer 24. Note that the front-face side optical film 22 can be attached to the liquid crystal display panel 12 at any arbitrary point in the aforementioned process.

Note that, on a mother liquid crystal display substrate (attached substrates) which includes a plurality of liquid crystal display panels 12, a microlens array 14 may be formed by a method similar to the above, and thereafter the liquid crystal display substrates may be cut apart by a method described in e.g. the pamphlet of International Laid-Open No. 03/040049, thus forming the attached substrates as shown in FIG. 4(f).

Finally, as shown in FIG. 4(g), the flexible printed wiring board 13 is attached to the upper face of the overhang 37 of the electrical element substrate 30. Attachment of the flexible printed wiring board 13 is performed by the method described in Patent Document 4, for example.

Specifically, first, while accurately positioning the connection electrodes (terminal portion) formed on the upper face of the overhang 37 of the electrical element substrate 30 against the connection electrodes of the flexible printed wiring board 13, one end of the flexible printed wiring board 13 is overlaid on the upper face of the overhang 37 of the electrical element substrate 30, via an anisotropic electrically conductive film. The electrical element substrate 30 and the flexible printed wiring board 13 in this state are placed on a stage of a thermocompression apparatus, and the tip of a heater tool of a thermocompression head is pressed against the portion of connection between the flexible printed wiring board 13 and the electrical element substrate 30. Thereafter, the heater tool is heated to allow the flexible printed wiring board 13 to be thermocompressed against the electrical element substrate 30, and both wiring lines are electrically connected.

The support 26, which is a thick layer portion made of the same material as the microlenses 14a, does not exist on the rear side of the overhang 37 to which the flexible printed wiring board 13 is attached. Therefore, cracking and chipping hardly occur in the substrate and the like. Note that the connection terminals of the electrical element substrate 30 can also be formed on the lower face of the overhang 37, in which case the flexible printed wiring board 13 is to be attached to the lower face of the overhang 37.

In the steps in FIGS. 4(c) to (e) above, the microlens array 14 and the like can be formed by a method such as a transfer technique, for example. In the case of using a transfer technique, a stamper is pressed against the resin layer 11 to transfer a template of the stamper, whereby the microlens array 14 and the support 26 (and also the protrusions 38 in the case where the protrusions 38 are to be formed) are formed. As a result, a liquid crystal display panel having a similar structure to that which shown in FIG. 4(e) is obtained.

The microlens array 14 of the liquid crystal display panel with a microlens array according to the present invention can be formed by the method described in Patent Document 3, for example. According to this method, as shown in FIG. 4(c), irradiation light for exposure is radiated onto the photocurable resin layer 11 through the liquid crystal display panel 12. At this time, the incident angle of the irradiation light for exposure with respect to the liquid crystal display panel 12 is changed in a stepwise or gradual manner, thus locally changing the irradiation intensity on the photocurable resin layer 11, whereby microlenses 14a corresponding to the respective pixels are formed. By providing a flat portion in the apex portion of each microlens 14a, the effect of brightness improvement by the microlenses can be further increased.

Figure 5:
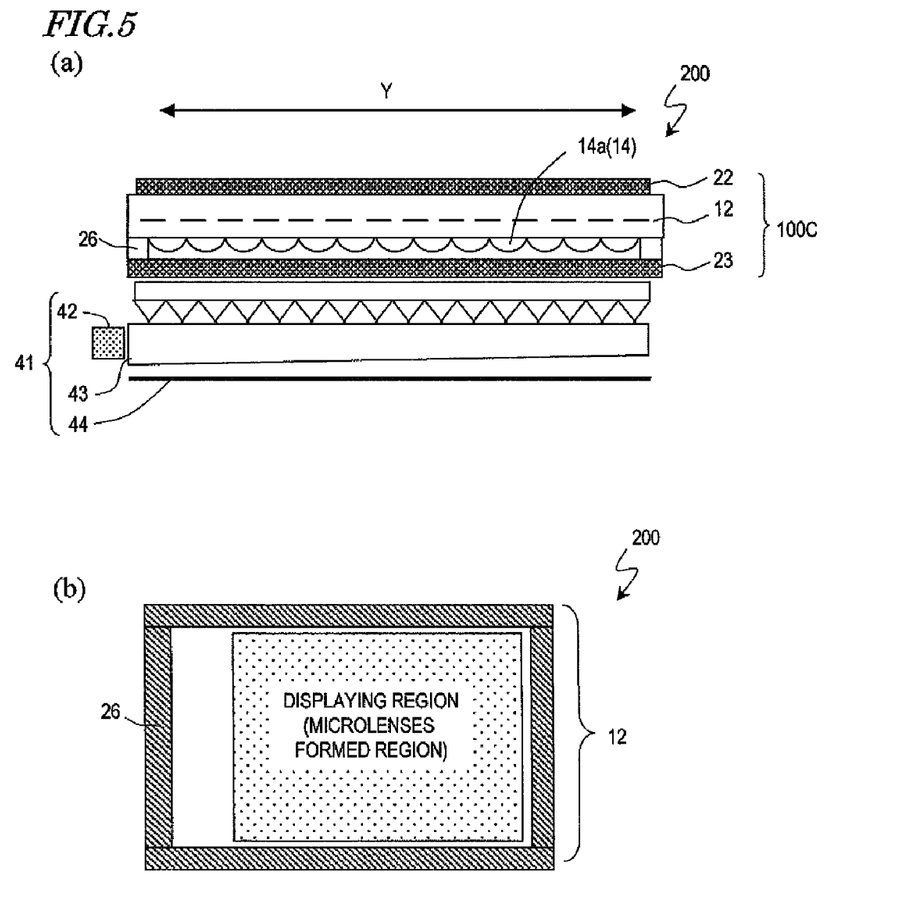
FIG. 5 (a) is a cross-sectional view schematically showing a liquid crystal display device having a liquid crystal display panel with a microlens array according to the present invention; and (b) is a plan view showing an attachment region of liquid crystal display device.

FIG. 5 schematically shows the construction of a liquid crystal display device 200 having a liquid crystal display panel 100C according to an embodiment of the present invention. The liquid crystal display panel 100C corresponds to the liquid crystal display panels 100A and 1008 with a microlens array of the present embodiment. However, the overhang 37 of the electrical element substrate 30 and the flexible printed wiring board 13 are omitted from illustration.

The liquid crystal display device 200 includes the liquid crystal display panel 100C and a backlight 41 having high directivity. The high-directivity backlight 41 includes a light source 42, a light guide plate 43 for receiving light emitted from the light source 42 and allowing it to propagate therethrough and be emitted toward the liquid crystal display panel 100C, and, a reflector 44 for causing the light which is emitted from the rear face of the light guide plate 43 or light which is incident from outside of the liquid crystal display device 200 and transmitted through the liquid crystal display panel 100C and the light guide plate 43 to be reflected toward the light guide plate 43.

The backlight 41 emits light that has a low directivity along the direction in which LEDs used as the light source 42 are arranged and a high directivity along a direction which is orthogonal thereto. Note that directivity is an index indicating a degree of divergence of light from the backlight 41 (degree of parallelism), and usually an angle which results in a brightness that is half of the brightness in the frontal direction is defined as a half-directivity angle. Therefore, as this half-directivity angle becomes smaller, the backlight has more of a peak (having a high directivity) in the frontal direction.

As the backlight 41 suitable for use in the liquid crystal display device 200, for example, backlights which are described in IDW'02 "Viewing Angle Control using Optical Microstructures on Light-Guide Plate for Illumination System of Mobile Transmissive LCD Module", K. KALANTAR, p 549-552, IDW'04 "Prism-sheetless High Bright Backlight System for Mobile Phone" A. Funamoto et al. p. 687-690, Japanese Laid-Open Patent Publication No. 2003-35824, Japanese National Phase PCT Laid-Open Publication No. 8-511129, and the like are applicable.

By providing the microlens array 14, light which illuminates areas other than the pixels (apertures), i.e., light which is emitted from the backlight 41 toward a light-shielding film BM that is formed around the pixels, is guided by the microlenses 14a to the pixels and emitted from the liquid crystal display panel 100C. As a result, the efficiency of light utility of the backlight 41 is improved.

In order to obtain a high efficiency of light utility in a display panel having a microlens array, such as the liquid crystal display panel 100C, it is preferable that the backlight 41 has a high directivity. In other words, it is preferable that the half-directivity angle of light emitted from the backlight 41 is small.

On the other hand, as for the pixels, a higher efficiency of light utility can be obtained as their apertures become larger. However, in a transflective-type liquid crystal display panel, its characteristics as a reflection type are also important, and only a portion of each pixel (transmission region) is used for transmission displaying; therefore, there is a limitation to the aperture ratio (area ratio of the transmission region). In many cases, the aperture ratio in a transflective-type liquid crystal display panel is 20 to 60%. Thus, the present invention is suitably used for a liquid crystal display panel having a low aperture ratio, such as a transflective-type liquid crystal display panel.

The liquid crystal display panel 100C includes a front-face side optical film 22 and a rear-face side optical film 23 on both sides of the liquid crystal display panel 12. The rear-face side optical film 23 is attached to the support 26 of the liquid crystal display panel 12 via an adhesion layer which is formed on the outside of the image displaying region of the liquid crystal display panel 12, i.e., the so-called frame portion. As the adhesion layer, an adhesive tape can be used, for example, although this is not a limitation; any other adhesive can be used so long as it has adhesiveness. For example, at the periphery of the liquid crystal display panel 12 or the rear-face side optical sheet 23, an adhesive may be applied by using a dispenser or the like, or printed.

According to the present invention, the support 26 is formed from through the same photolithography process as the microlens array 14, and the flexible printed wiring board 13 is mounted to the overhang 37 projecting outside from the support 26. Thus, there are provided a high-quality liquid crystal display panel with a microlens array which has a good production efficiency and experiences little problem in the production steps, a production method thereof, and a liquid crystal display device incorporating the same.

INDUSTRIAL APPLICABILITY

The present invention improves the quality and production efficiency of a liquid crystal display panel and a liquid crystal display device, and particularly improves the quality and production efficiency of a liquid crystal display panel and a liquid crystal display device which have a relatively small aperture ratio, such as a transflective-type liquid crystal display panel.

The invention claimed is:

1. A liquid crystal display panel with a microlens array, comprising:
   a liquid crystal display panel including an electrical element substrate on which switching elements are formed so as to respectively correspond to pixels;
   a microlens array provided on a light-incident side of the liquid crystal display panel;
   a support provided on the light-incident side of the liquid crystal display panel so as to be in a peripheral region of the microlens array;
   a rear-face side optical film attached to the liquid crystal display panel via the support; and
   a wiring connection substrate mounted to the electrical element substrate, wherein,
   the electrical element substrate includes an overhang which projects from the support in a direction of the wiring connection substrate, and the wiring connection substrate is mounted to the overhang.

2. The liquid crystal display panel with a microlens array of claim 1, wherein the overhang projects from the support in the direction of the wiring connection substrate by no less than 0.5 mm and no more than 5.0 mm.

3. The liquid crystal display panel with a microlens array of claim 1, wherein an end of the wiring connection substrate is located on the overhang.

4. The liquid crystal display panel with a microlens array of claim 3, wherein a distance between the end of the wiring connection substrate and an end of the support that is closer to the wiring connection substrate is no less than 0.3 mm and no more than 4.0 mm.

5. The liquid crystal display panel with a microlens array of claim 1, wherein the support is made of a same material as the microlens array.

6. The liquid crystal display panel with a microlens array of claim 1, wherein an electrical connection terminal of the electrical element substrate is formed on a face of the overhang.

7. The liquid crystal display panel with a microlens array of claim 1, wherein a plurality of protrusions are formed between the microlens array and the rear-face side optical film.

8. A production method for a liquid crystal display panel with a microlens array, the liquid crystal display panel having a liquid crystal display panel, a microlens array provided on a light-incident side of the liquid crystal display panel, and a rear-face side optical film provided on a light-incident side of the microlens array, the method comprising:
   (a) a step of providing a liquid crystal display panel, the liquid crystal display panel having an electrical element substrate on which switching elements are formed so as to respectively correspond to pixels;
   (b) a step of forming a resin layer on a face of the liquid crystal display panel;
   (c) a step of processing the resin layer to form a microlens array and a support which is in a peripheral region of the microlens array;
   (d) a step of attaching a rear-face side optical film to the liquid crystal display panel via the support; and
   (e) a step of mounting a wiring connection substrate to the electrical element substrate, wherein,
   in step (c), an outside end of the support is formed inside, by a predetermined distance, of an end of the electrical element substrate; and
   in step (e), the wiring connection substrate is mounted to a portion of the electrical element substrate spanning between the end of the support and the end of the electrical element substrate.

9. The production method of claim 8, wherein, in step (c), the end of the support is formed inside of the end of the electrical element substrate by no less than 0.5 mm and no more than 5.0 mm.

10. The production method of claim 8, wherein, in step (e), the wiring connection substrate is mounted so that an end of the wiring connection substrate is located between the end of the support and the end of the electrical element substrate.

11. The production method of claim 10, wherein a distance between the end of the support and the end of the wiring connection substrate is no less than 0.3 mm and no more than 4.0 mm.

12. The production method of claim 8, wherein,
    the resin layer is formed in step (b) is a photocurable resin layer; and
    step (c) comprises a step of exposing the photocurable resin layer to light through the liquid crystal display panel.

13. The production method of claim 8, comprising a step of forming an electrical connection terminal of the electrical element substrate in the portion of the electrical element substrate spanning between the end of the support and the end of the electrical element substrate.

14. The production method of claim 8, comprising a step of processing the resin layer to form a plurality of protrusions on a surface of the microlens array.

15. A liquid crystal display device comprising:
    a liquid crystal display panel including an electrical element substrate on which switching elements for controlling light transmittance of the liquid crystal layer are provided so as to respectively correspond to pixels;
    a microlens array provided on a light-incident side of the liquid crystal display panel;
    a support provided on the light-incident side of the liquid crystal display panel so as to be in a peripheral region of the microlens array;
    a rear-face side optical film attached to the liquid crystal display panel via the support; and
    a wiring connection substrate mounted to the electrical element substrate, wherein,
    the electrical element substrate includes an overhang which projects from the support in a direction of the wiring connection substrate, and the wiring connection substrate is mounted to the overhang.

16. The liquid crystal display device of claim 15, wherein an end of the wiring connection substrate is located on the overhang.

17. The liquid crystal display device of claim 15, wherein the support is made of a same material as the microlens array.

18. A liquid crystal display panel with a microlens array, comprising:
- a liquid crystal display panel including an electrical element substrate on which switching elements are formed so as to respectively correspond to pixels;
- a microlens array provided on a light-incident side of the liquid crystal display panel;
- a support provided on the light-incident side of the liquid crystal display panel so as to be in a peripheral region of the microlens array;
- a rear-face side optical film attached to the liquid crystal display panel via the support; and
- a wiring connection substrate mounted to the electrical element substrate, wherein,
- a thickness of the electrical element substrate at a position where the wiring connection substrate is mounted is substantially equal to a thickness of the electrical element substrate at a position where the microlens array is formed.

* * * * *